United States Patent [19]

Sausner et al.

[11] Patent Number: 5,181,492
[45] Date of Patent: Jan. 26, 1993

[54] SHAFT-ROTATED THROTTLE DISK

[75] Inventors: Andreas Sausner, Frankfurt am Main; Karl H. Spies, Birkenau, both of Fed. Rep. of Germany

[73] Assignee: Firma Carl Freudenberg, Weinheim, Fed. Rep. of Germany

[21] Appl. No.: 781,783

[22] Filed: Oct. 23, 1991

[30] Foreign Application Priority Data

Jan. 9, 1990 [DE] Fed. Rep. of Germany ....... 4100378

[51] Int. Cl.⁵ ................................................ F02D 9/08
[52] U.S. Cl. ..................................... 123/337; 251/357
[58] Field of Search ................ 123/337, 403; 251/305, 251/306, 357, 358; 29/890.12, 890.124, 890.127

[56] References Cited

U.S. PATENT DOCUMENTS

| | | | |
|---|---|---|---|
| 4,779,590 | 10/1988 | Uthoff, Jr. | 123/337 |
| 4,836,163 | 6/1989 | Muschalik | 123/337 |
| 5,035,214 | 7/1991 | Daly et al. | 251/357 |
| 5,081,972 | 1/1992 | Daly et al. | 123/337 |

Primary Examiner—Raymond A. Nelli
Attorney, Agent, or Firm—Sprung Horn Kramer & Woods

[57] ABSTRACT

A shaft-rotated throttle disk for use in the intake pipe of an internal combustion engine. The shaft is solid and the disk comprises a body (2) of material around it. The throttle disk offers little resistance to the flowing mixture and allows precise adjustment and regulation of the internal combustion engine upon closing. A seal (4) on the outside of the disk material extends on both sides as far as the shaft (1). The seal can be fully engaged with the intake pipe (3) by rotating the shaft.

7 Claims, 2 Drawing Sheets

U.S. Patent   Jan. 26, 1993   Sheet 1 of 2   5,181,492
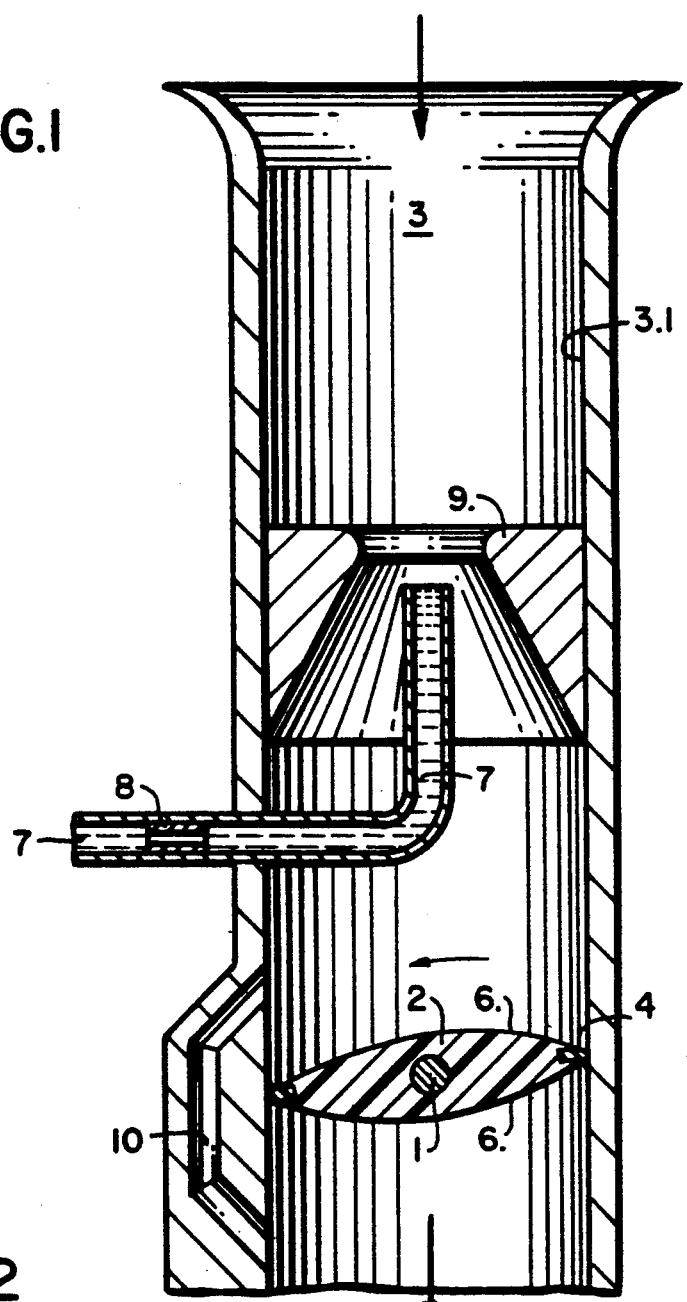
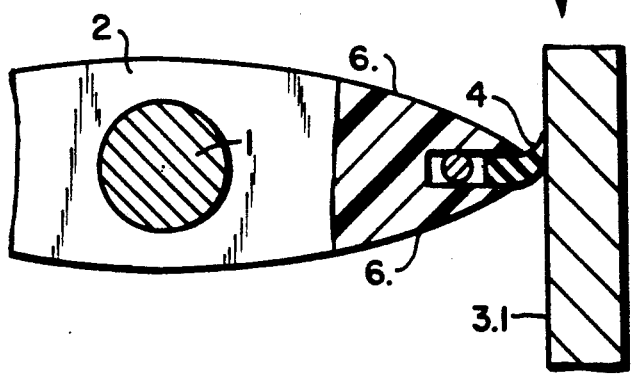
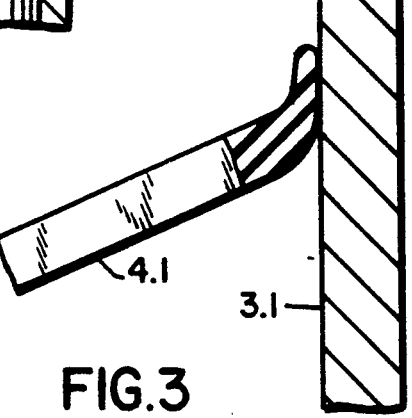

SHAFT-ROTATED THROTTLE DISK

BACKGROUND OF THE INVENTION

The present invention concerns a shaft-rotated throttle disk for use in the intake pipe of an internal combustion engine, whereby the shaft is solid and the disk includes a body of material surrounding the shaft.

Throttle disks are employed to regulate the flow of a fluid medium through a pipe. Such disks are typically utilized in the intake pipe of an internal combustion engine. To minimize rheological losses on the part of the mixture of fuel and air flowing past the disk inside the intake pipe, the impedances at the surface and on top of the disk must be minimized. Decreasing the rheological losses helps to fill the engine's combustion chamber, increasing the engine's power and improving fuel economy.

The situation in the intake pipe must be definite and unambiguous for the engine to be satisfactorily adjusted and regulated. Precise regulation and adjustment of an idling internal combustion engine is possible only when a precisely known air leakage current, if any, is flowing past the throttle disk.

It is well known to regulate the mixture of fuel and air of an engine with a sheet metal throttle disk rotating in a slotted shaft. The disk is inserted through a slot in the center of the shaft and secured to the shaft, for example, by screws.

A throttle disk that actually surrounds the throttle shaft in an intake pipe is known from the German patent publication No. 2,934,216.

Methods of applying a coat of polymer to the inner surface of an intake pipe in the vicinity of a throttle valve are also known. Such methods are disclosed, for example, in German Patent No. 3,243,996.

One particular drawback of a sheet metal throttle disk extending through a slotted shaft is that its shape in the intake pipe inhibits the fluid flow, and losses occur. The engine's output decreases because fuel-air mixture is prevented from reaching the combustion chamber.

There are also considerable problems in sealing the slotted shaft with respect to the disk. Manufacturing tolerances that cannot be practically or economically eliminated prevent the shaft and disk from completely blocking the intake pipe. As a result, the idling internal combustion engine can be adjusted and regulated only with difficulty. If the throttle disk is constructed to surround a solid shaft, there will be drawbacks with respect to the life of the areas adjacent to the circumference of the throttle disk and to how well it is sealed with respect to the intake pipe. The very acute angle between the surfaces entails the risk of chips breaking away from the throttle disk edges, which are integral components of the disk and made of the same material, thereby affecting the engine's operation when the throttle disk is partly or completely closed.

SUMMARY OF THE INVENTION

A principal object of the present invention is to provide a rheologically practical throttle disk that will allow precise adjustment and regulation of the internal combustion engine upon closing the valve during idling and/or coasting of the engine.

This object, as well as other objects which will become apparent from the discussion that follows, are attained in accordance with the present invention by providing a seal on the outside of the disk material that extends on both sides as far as the shaft such that the seal can be fully engaged with the intake pipe by rotating the shaft.

The throttle disk according to the invention can be made of either a polymer or a metal. A polymer will prevent heat from being transmitted to the shaft. This characteristic is extremely significant to efficient engine operation. The seal around the throttle disk enables highly precise adjustment of the size of the opening, commencing from the closed state. This feature also contributes significantly to efficient operation. If its circumference is flexible enough to act as a seal, the polymer disk can be made out of one material and have a sealing lip.

The throttle disk can be either positively secured or form fitted to the shaft. The two components can be sealed with respect to each other by surrounding the lateral face sides of the disk body in the region of the shaft with first sealing surfaces that extend in a direction transverse to the shaft.

Second sealing surfaces will then be needed to secure the elastomeric seal that seals off the flow between the throttle disk and the intake pipe when the disk is closed. The first sealing surfaces can merge into the second sealing surfaces. This mode of transition simplies the manufacture of the disk.

Secondary sealing means, axial face seals for example, are provided for sealing off the first sealing surfaces. Axial face seals are small enough to use in a limited space.

The seals on the second sealing surfaces can be secured to the body of material. This approach facilitates repair in the event that the seal wears out.

To ensure unexceptionable sealing, the seals can consist of lips of an elastomeric material for example. The advantage of an elastomer is that it will elastically deform to optimally match the inner surface of the intake pipe.

The seal can be secured to the body of material by directly molding it around the material and hardening it. This type of attachment will not affect the light weight and associated low inertia of the throttle disk. The procedure is also of advantage from the aspect of manufacturing technology.

When the throttle disk is open, it must present as little resistance as possible to the medium flowing by. It is accordingly practical to demarcate the body of material between the first and second sealing surfaces with surfaces that are as free as possible of sudden changes in direction and shaped for example to approach each other more and more as they approach the second sealing surfaces.

The preferred embodiments of the present invention will now be described with reference to the accompanying drawings.

BRIEF DESCRIPTION OF THE DRAWINGS

FIG. 1 is a cross-sectional view of the intake pipe of an internal combustion engine which incorporates a shaft-rotated throttle disk in accordance with the preferred embodiment of the present invention.

FIG. 2 is a cross-sectional view of one side of the throttle disk and a short section of the intake pipe of FIG. 1.

FIG. 3 is a representational diagram illustrating in detail the region "A" of FIG. 2.

DESCRIPTION OF THE PREFERRED EMBODIMENT

Figure 4:
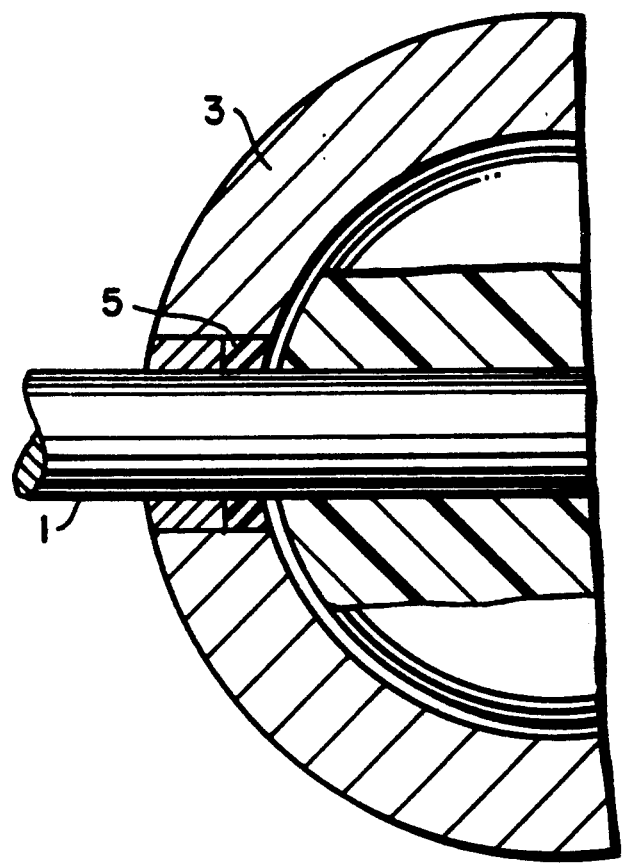
FIG. 4 is a transverse cross-sectional view of the intake pipe and shaft-rotated throttle disk of FIG. 1.

FIG. 1 illustrates an intake pipe 3 as well as throttle and carburetor components that regulate a mixture of fuel and air in an internal combustion engine.

Air is drawn in by the engine and flows through the intake pipe 3. Accommodated in the pipe is a nozzle 9, wherein fuel from an injector 7 is mixed with the incoming air.

A throttle disk 2 regulates the volume of mixture passed to the engine and, accordingly, the engine torque. A high-speed nozzle 8 controls the composition of the mixture.

The air is strongly accelerated in the nozzle 9 to ensure satisfactory atomization of the fuel. This process produces a vacuum that entrains the fuel out of the injector 7. While idling, the engine is supplied with mixture through a bypass line 10, throttle disk 2 being closed. The bypass 10 is designed to ensure a satisfactory transition from idling to the power delivery phase.

The invention itself can be employed to regulate air flow not only in a carburetor, as illustrated here, but also in the intake pipe of a fuel injected internal combustion engine.

FIG. 2 illustrates a larger-scale representation of the detail A in FIG. 1.

The flow-promoting polymer or metal throttle disk 2 surrounds a throttle shaft 1. A seal 4 extends along the edge of throttle disk 2. As the shaft 1 rotates, it engages the seal with the inner surface 3.1 of intake pipe 3. The seal 4 is secured to the throttle disk 2. To improve its contact with intake pipe 3, the seal is made of an elastomer such as rubber.

FIG. 3 illustrates the two individual sealing components—seal 4, which can be an integrated lip 4.1, engaging the inner surface 3.1 of the intake pipe.

FIG. 4 illustrates how the throttle disk 2 is mounted inside the intake pipe 3.

Shaft 1, which is solid and can accordingly be more slender than a slotted shaft, is secured within the intake pipe 3 in an axial face seal 5. The solidity of the shaft 1 considerably decreases the wear on seal 5.

Figure 5:
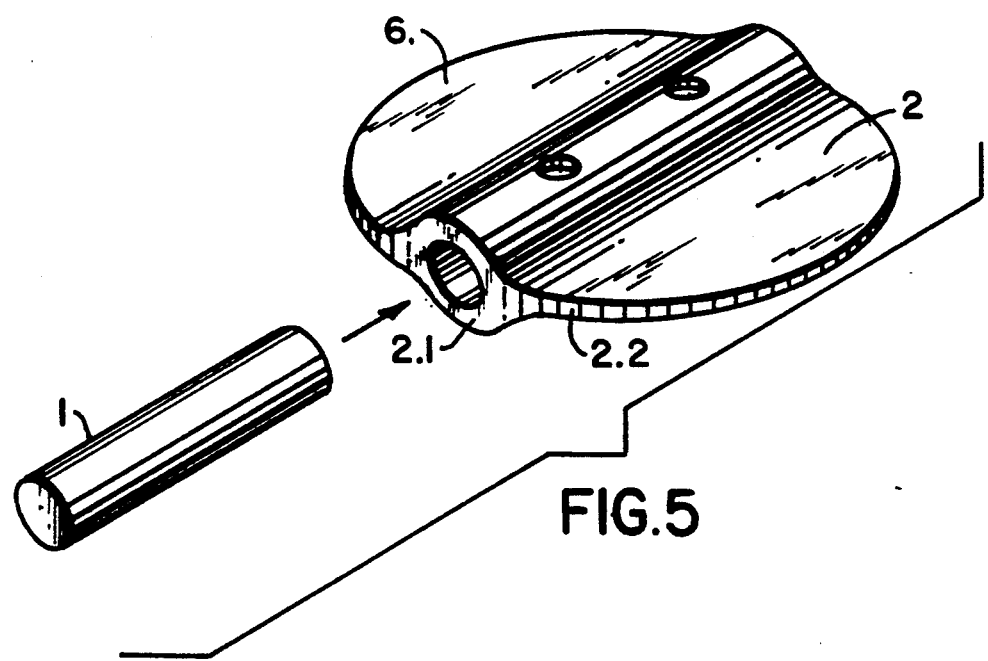
FIG. 5 is a perspective view of a throttle disk and shaft of the type utilized in the embodiment of FIG. 1.

FIG. 5 illustrates a flow-promoting throttle disk that consists of a body 2 of polymer or metal. The first sealing surfaces 2.1 and second sealing surfaces 2.2 extend around the edge of the body and merge into each other. The surface 6 of the throttle disk is aerodynamically designed to permit free flow of air.

Shaft 1 is solid and is completely surrounded by the body 2 of material. The body can be secured to the shaft either positively, by screws for example, or non-positively by form fitting.

There has thus been shown and described a novel shaft-rotated throttle disk which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a shaft-rotated throttle disk for use in the intake pipe of an internal combustion engine, whereby the shaft is solid and the disk includes a body of material surrounding the shaft, the lateral face sides of the body of material surrounding the shaft forming first sealing surfaces that extend in a direction transverse to the shaft; the improvement comprising resilient lips of elastomeric material arranged on the outside of the body of material and secured to its circumference and extending on both sides thereof as far as the shaft, said resilient lips forming second sealing surfaces which can be fully engaged with the intake pipe of the engine by rotating the shaft.

2. The throttle disk defined in claim 1, wherein the first sealing surfaces merge into the second sealing surfaces.

3. The throttle disk defined in claim 1, further comprising secondary sealing means in the vicinity of the first sealing surfaces.

4. The throttle disk defined in claim 3, wherein the secondary sealing means are axial face seals.

5. The throttle disk defined in claim 1, wherein the additional seals are produced by molding them directly to the body of material and allowing them to cure.

6. In a shaft-rotated throttle disk for use in the intake pipe of an internal combustion engine, whereby the shaft is solid and the disk includes a body of material surrounding the shaft, the lateral face sides of the body of material surrounding the shaft forming first sealing surfaces that extend in a direction transverse to the shaft; the improvement comprising a seal arranged on the outside of the body of material and extending on both sides thereof as far as the shaft, said seal forming second sealing surfaces which can be fully engaged with the intake pipe of the engine by rotating the shaft, and said body of material being surrounded between the first and second sealing surfaces by surfaces that are free of sudden changes in direction.

7. The throttle disk defined in claim 6, wherein the opposite face surfaces of the body of material approach each other more and more as they approach the second sealing surfaces.

* * * * *